United States Patent [19]

Smith et al.

[11] Patent Number: 4,603,116
[45] Date of Patent: Jul. 29, 1986

[54] SILICON NITRIDE BASED CERAMICS AND METHOD

[75] Inventors: J. Thomas Smith; Carr Lane W. Quackenbush; Anthony P. Moschetti, all of Acton; Helmut Lingertat, Dorchester, all of Mass.

[73] Assignee: GTE Laboratories Incorporated, Waltham, Mass.

[21] Appl. No.: 781,314

[22] Filed: Sep. 27, 1985

Related U.S. Application Data

[63] Continuation of Ser. No. 597,580, Apr. 9, 1984, abandoned, which is a continuation of Ser. No. 402,177, Jul. 26, 1982, abandoned.

[51] Int. Cl.$^4$ .............................................. C04B 35/58
[52] U.S. Cl. ......................................... 501/97; 264/65
[58] Field of Search ............................. 501/97; 264/65

[56] References Cited

U.S. PATENT DOCUMENTS

| | | | |
|---|---|---|---|
| 3,244,480 | 4/1966 | Johnson et al. | 423/344 |
| 3,992,497 | 11/1976 | Terwilliger | 501/97 |
| 4,073,845 | 2/1978 | Buljan et al. | 501/97 |
| 4,097,293 | 6/1978 | Komeya et al. | 501/97 |
| 4,101,616 | 7/1978 | Buljan | 423/344 |
| 4,122,155 | 10/1978 | Prochazka | 423/344 |
| 4,179,486 | 12/1979 | Lange | 501/97 |
| 4,205,033 | 5/1980 | Hattori et al. | 501/97 |
| 4,264,547 | 4/1981 | De Pous | 501/97 |
| 4,280,850 | 7/1981 | Smith et al. | 501/97 |
| 4,346,068 | 8/1982 | Kasai et al. | 501/97 |
| 4,350,771 | 9/1982 | Smith | 501/97 |

Primary Examiner—Mark L. Bell
Attorney, Agent, or Firm—Ivan L. Ericson

[57] ABSTRACT

A method of preparing fully dense silicon nitride based ceramic articles comprises the steps of blending a metal oxide component and silicon nitride, wherein a portion of the silicon nitride comprises acicular crystals; comminuting the powder mixture to reduce the aspect ratio of the acicular crystals to an average of less than about 3; pressing the comminuted powder to form a compact; and pressureless sintering the compact to a fully dense ceramic body. Powder mixtures and powder compacts for forming fully dense silicon nitride based ceramic bodies are also disclosed.

4 Claims, 5 Drawing Figures

SILICON NITRIDE BASED CERAMICS AND METHOD

This is a continuation of co-pending application Ser. No. 597,580 filed on Apr. 9, 1984 which is a continuation of application Ser. No. 402,177 filed July 26, 1982, both abandoned.

BACKGROUND OF THE INVENTION

This invention relates to methods and materials for the preparation of silicon nitride based ceramic articles. More particularly, it is concerned with powder mixtures and compacts for pressureless sintering, and with methods for preparing such powder mixtures and compacts and with methods for preparing fully dense silicon nitride ceramic articles therefrom.

Densified composite ceramic articles based upon silicon nitride have been the subject of considerable recent study. Silicon nitride powder mixtures when consolidated to near theoretical density possess desirable high temperature properties. These ceramic materials have refractory character, high temperature creep resistance, thermal shock resistance, and high temperature strength which make them ideal for many high temperature application.

Three methods have generally been employed to produce densified ceramic articles from powder mixtures: hot pressing, hot isostatic pressing, and so-called pressureless sintering. Hot pressing involves the simultaneous application of heat and mechanical pressure to the powder mixture at temperatures high enough to cause sintering. Typically, pressures of several tons per square inch are applied to the powder mixture, usually by means of a uniaxial ram press.

In the hot isostatic pressing method, the powder mixture is placed in a non-permeable deformable container to which heat and pressure are applied. In this method, pressure is applied equally to all faces of the powder compact, usually by means of a pressurized fluid.

So-called pressureless sintering of powder compacts generally connotes the process of thermally densifying pre-pressed powder compacts without the use of a container for the compact and without the aid of high pressures applied externally to the compact to drive the powder particles together.

Sintering is the preferred method of densifying composite ceramic articles because of the cost and complexity of equipment needed for other methods of densification.

The fabrication of silicon nitride ceramics from powder mixtures has generally been successful only when densifying additives are added which allow for liquid phase sintering to occur. Even then, the ease of pressureless sintering of silicon nitride varies markedly with the particular densifying additive employed. High temperatures can often cause the undesired thermal decomposition or volatilization of components of the powder mixture. To counteract this problem, it has been the practice to add small amounts of lower melting oxides such as aluminum oxide, magnesium oxide or the like to mixtures of silicon nitride and yttrium oxide to enhance the sintering process by lowering the temperature required for liquid phase sintering. However, addition of such lower melting oxides often has the undesirable effect of reducing the high temperature strength, creep resistance, and oxidation resistance of the final densified ceramic.

SUMMARY OF THE INVENTION

It has been found in accordance with the present invention that silicon nitride powder mixtures can be more readily sintered to high density ceramic articles (i.e. 98%) or fully dense ceramic articles by careful control of the degree of acicularity of the starting silicon nitride powder. The degree of acicularity of the crystalline component of the silicon nitride contained in the starting powder mixture markedly affects the ease of compaction of the powder to a "green" compact (i.e. before sintering) and the subsequent ease of sintering to a densified ceramic.

By the term "acicularity", as used throughout this specification and the appended claims, is meant the degree of needle-like character of the silicon nitride crystals as measured by the aspect ratio (average length divided by average width) of the crystals. The method of the present invention affords a means of producing intricately shaped silicon nitride ceramic articles having near net shape by permitting the compaction of starting powder mixtures to green compacts of higher densities, subsequently increasing the ease and rate of liquid phase sintering of the compact to a densified ceramic article.

In accordance with one aspect of the present invention, a method for preparing dense silicon nitride based ceramic articles comprises the steps of blending from about 1 to about 25 mole percent of a particulate metal oxide component and particulate silicon nitride, wherein at least a portion of the silicon nitride consists of acicular crystals, comminuting the blend of metal oxide and silicon nitride to form a powder mixture wherein the average aspect ratio of the acicular silicon nitride crystals is less than about 3, compacting the comminuted powder mixture to form a green compact, and pressureless sintering the compact to form a densified silicon nitride ceramic article.

In accordance with another aspect of the present invention, a powder mixture for use in the fabrication of silicon nitride based ceramic articles by the method of pressureless sintering comprises from about 1 to about 25 mole percent of a metal oxide with the balance consisting essentially of silicon nitride wherein at least a portion of the silicon nitride comprises acicular crystals, the powder characterized by an average B.E.T. particle size of less than 1 micron and an average aspect ratio of the acicular silicon nitride crystals of less than about 3.

In accordance with yet another aspect of the present invention, a green powder compact for pressureless sintering having a density of at least 60% of theoretical comprises from about 1 to about 25 mole percent of a metal oxide component with the balance consisting essentially of silicon nitride wherein at least a portion of the silicon nitride comprises acicular crystals having an average aspect ratio of less than about 3.

DETAILED DESCRIPTION OF THE INVENTION

Figure 1:
FIG. 1 is a photomicrograph at 10,000× of a commercially available silicon nitride powder.

Commercial methods of preparing silicon nitride powder often result in a product which contains a component of acicular or needle-like crystalline silicon nitride. FIG. 1 shows, for example, a sample of commercially available silicon nitride photographed at a magnification of 10,000×. The acicular component of the powder mixture is clearly evident.

Attempts to compact powder mixtures containing silicon nitride having a substantial acicular crystalline component result in green bodies which have densities significantly below about 60% of theoretical. If these green compacts are derived from powder mixtures which contain substantial amounts of a low melting oxide sintering aid, the low initial green density of the powder compact may not present a problem in sintering the compact to a fully dense ceramic article. However, in the cases where the compacts are derived from powder mixtures including higher melting oxides which are difficult to sinter by pressureless sintering methods (such as mixtures containing yttrium oxide as the predominant metal oxide component) green body densities below about 60% of theoretical cannot be sintered to acceptable final densities.

In the art, it has generally been taught that the average particle size of the powder mixture is the critical factor in determining ease of sinterability of silicon nitride ceramics. It has been found, however, in accordance with the present invention that the degree of acicularity of the crystalline silicon nitride component of the powder mixture is just as important in determining both green body density and final sintered body density of silicon nitride ceramic articles. If the acicularity (i.e., aspect ratio) of the crystalline silicon nitride is too high, generally represented by an average crystalline particle aspect ratio greater than about 3, the material cannot be compressed into a powder compact of sufficient green density to be sintered by liquid phase sintering techniques.

In accordance with the method of the present invention, to fabricate silicon nitride ceramic articles by the liquid phase sintering method, the first step comprises blending from about 1 to about 25 mole percent of a metal oxide sintering additive with powdered silicon nitride. Suitable metal oxides include silicon dioxide, magnesium oxide, aluminum oxide, yttrium oxide, the rare earth metal oxides, and mixtures thereof. Silicon dioxide may comprise surface oxide coating present on the silicon nitride, material deliberately added to the powder mixture, or both.

The mixture of silicon nitride and metal oxide is next comminuted by ball milling, jet milling, or similar processes to reduce the acicularity of the crystalline silicon nitride component of the mixture to an average aspect ratio of less than about 3. Comminution is preferably carried out by ball milling the powder mixture in a mill containing milling media roughly 15 to 30 times the weight of the powder charge. In addition, the milling jar should have considerable free space to permit the milling media to have a large mean free path of fall during milling. Both of the foregoing considerations result in effective milling media impact to reduce the acicularity of the crystalline silicon nitride to the desired level.

The process of reducing the acicularity of the silicon nitride is monitored by periodically removing a sample from the milling jar and pressing a sample pill. The pill is fractured and the fracture surface is examined to determine the degree of acicularity of the silicon nitride. The ball milling step serves the multiple functions of reducing the acicularity of the crystalline silicon nitride component of the mixture, reducing the average B.E.T. particle size of the powder mixture to a value preferably below about 1 micron, and thoroughly blending the components of the powder mixture.

In the next step of the method, the comminuted powder mixture is pressed, preferably at ambient temperatures, to a green body having a density of at least 60% of theoretical. The prior comminution step reduces the average aspect ratio of the crystalline silicon nitride component of the powder mixture to a value less than about 3 which permits pressing to a green body density in excess of 60% of theoretical at pressure of about 20,000 psig ($1.38 \times 10^5$ kPa).

In the final step of the method, the compacted green body is sintered at temperatures of between about 1700° C. to about 1900° C. for a period sufficient to produce a final sintered density of at least 98% of theoretical. Sintering times and temperatures are generally lower for compacts made in accordance with the above-described method than sintering schedules generally given in the prior art. Exact sintering times and temperatures for a given sintering additive can be determined by routine experimentation. As disclosed and claimed in co-pending application Ser. No. 333,235, filed Dec. 21, 1981 and assigned to the present assignee, it is preferred that the sintering step be carried out in a nitrogen gas atmosphere at a pressure which is related to the sintering temperature to inhibit volatilization or decomposition of the silicon nitride. It has been found in accordance with the method of this invention that nitrogen pressures useful in this step of the invention are related to the sintering temperature by the expression:

$$P = e^{[(-a/T + b]}$$

where P is the pressure in atmospheres, T is the absolute temperature in degrees Kelvin, and a and b are integers having the values of about $2.9 \times 10^4$ and 15.43, respectively.

The following examples are provided to enable one skilled in the art to practice the present invention. However, the examples are not to be viewed as limiting the scope of the invention as defined by the appended claims, but merely as illustrative thereof.

Examples I-VII illustrate the general relationship between green body and final sintered density for several silicon nitride ceramic articles made by liquid phase sintering.

EXAMPLES I-VII

In each of the following examples, a powder compact was prepared by thoroughly blending a mixture of 20 weight percent yttrium oxide, about 3 weight percent silicon dioxide, about 2 weight percent aluminum oxide, with the balance consisting essentially of silicon nitride. The blended bodies were pressed to form unsintered compacts having various green body densities. Each compact was sintered for about 1½ to 2 hours at either 1700° C. or 1750° C. to produce a sintered body. The densities of both the green compact and the final sintered body are presented in Table 1.

TABLE 1

| Example | Green Body Density (% Theoretical) | Sintered Body Density (% Theoretical) | Sintering Temperature |
| --- | --- | --- | --- |
| I | 56 | 52 | 1700° C. |
| II | 57 | 61 | 1700° C. |
| III | 59 | 67 | 1700° C. |
| IV | 61 | 77 | 1750° C. |
| V | 66 | 96 | 1750° C. |
| VI | 68 | 99 | 1700° C. |
| VII | 68 | 99 | 1750° C. |

In examples VIII-XII, powder mixtures comprising about 3 weight percent silicon dioxide, about 6 weight percent yttrium oxide, with the balance consisting essentially of silicon nitride were pressed to compacts having various green densities ranging between about 54% to about 65% of theoretical. The silicon nitride powder was milled for varying periods prior to blending with the yttrium oxide sintering additive, with the exception of Example XII where the two powders were milled together. The milling step was employed to reduce the acicularity of the crystalline silicon nitride component of the powder. The green compacts were sintered at about 1900° C. for 1½ to 2 hours. The higher sintering temperature was required because of the greater difficulty encountered in liquid phase sintering silicon nitride powder compacts where the metal oxide sintering aid is a higher melting composition. The densities of both the green compact and the final sintered body for each example are presented in Table 2.

TABLE 2

| Example | Milling Time (Hours) | Green Body Density (% Theoretical) | Sintered Body Density (% Theoretical) | Sintering Temperature |
| --- | --- | --- | --- | --- |
| VIII | 12 | 54.1 | 87.6 | 1900° C. |
| IX | 24 | 57.3 | 88.7 | 1900° C. |
| X | 48 | 60.9 | 95.5 | 1900° C. |
| XI | 96 | 63.4 | 98.4 | 1900° C. |
| XII* | 96 | 65.0 | 99.6 | 1900° C. |

*Silicon nitride and yttrium oxide powders milled together.

Figure 5:
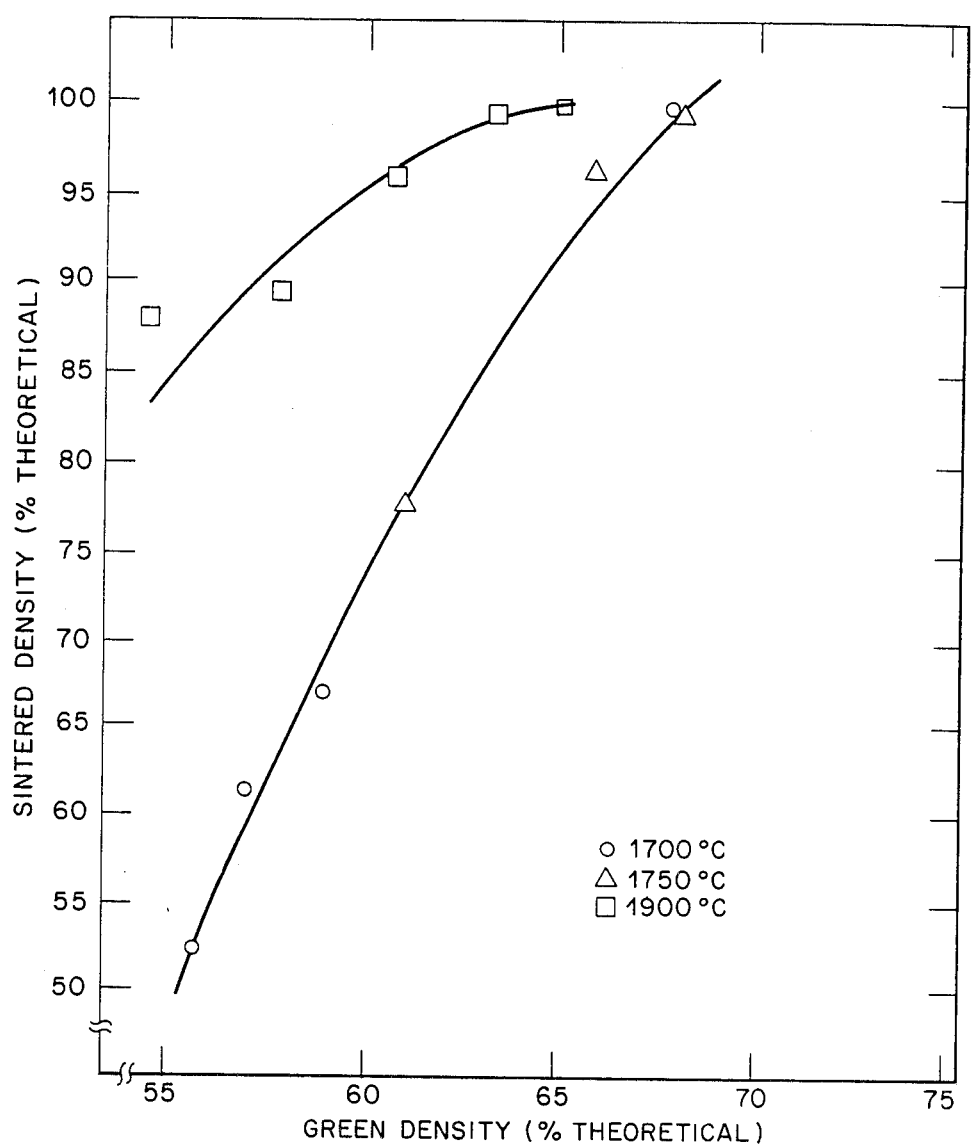
FIG. 5 is a graph illustrating the relationship between the green density of unsintered silicon nitride powder compacts and the final sintered density of densified silicon nitride ceramic articles.

The data appearing in Tables 1 and 2 have been plotted in FIG. 5. As can be seen, the density of the final sintered body increases rapidly with increasing density of the pressed green body. To achieve final sintered densities which are acceptable for most non-porous ceramic applications, the green body density is preferably above about 60% of theoretical. This criterion becomes more important as the choice of metal oxide sintering aid gives rise to powder compacts more difficult to sinter. In these cases, the higher temperatures required for liquid phase sintering often lead to volatilization of components from the powder mixture or thermal decomposition of silicon nitride. The close packing of particles in the powder compact enhances the rate of liquid phase sintering leading to a more fully densified sintered body in reaction periods sufficiently short so that volatilization of components can be controlled.

The compositions represented by Examples I-VII contain aluminum oxide which enhances liquid phase sintering at lower temperatures (i.e., about 1700° C.). The data show, however, that even with the advantages of easier liquid phase sintering conferred upon these examples by the aluminum oxide, green body densities below about 60% of theoretical did not produce sintered body densities acceptable for most applications. In fact, for Example I, the final sintered density (52%) was less than the pressed green body compact density (56%). As the green body densities rise above about 60% of theoretical, the sintered body densities correspondingly increase to acceptable values.

In examples VIII-XII, the sintering aid is yttrium oxide; the higher sintering temperature (1900° C.) reflects the refractory character of this sintering aid. The increase in final sintered density is less steep than in the examples employing aluminum oxide; however, acceptable final sintered body densities of 95% or better are not achieved at green body densities below about 60% of theoretical.

Examples XIII-XV illustrate the effect upon green body density of reduction of the acicularity of the silicon nitride component of the powder mixture prior to pressing the powder into a green compact.

EXAMPLES XIII-XV

In the examples, a mixture of about 6 weight percent yttrium oxide, about 2 to about 4 weight percent silicon dioxide (present as a surface oxide coating on the silicon nitride) with the remainder consisting essentially of silicon nitride was rolled in a ball mill. At various points during the milling operation, the process was halted and a sample of the milled powder mixture was removed and pressed into a pill at about 20,000 psig (about $1.38 \times 10^5$ kPa). Each pressed pill was fractured and the fracture surface was examined and photographed at 10,000× magnification. The data for these examples appear in Table 3 and the photomicrographs corresponding to each example appear in FIGS. 2-4.

TABLE 3

| Example | FIG. | Milling Time (Hours) | Green Body Density (% Theoretical) | Typical Aspect Ratio | Particle Size (B.E.T.) |
| --- | --- | --- | --- | --- | --- |
| XIII | 2 | 24 | 53.1 | 9 | 0.4 micron |
| XIV | 3 | 48 | 59.1 | 8 | — |
| XV | 4 | 72 | 61.4 | 3 | 0.2 micron |

Figure 2:
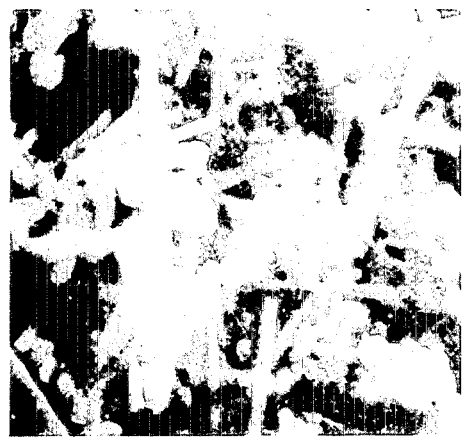
FIGS. 2–4 are photomicrographs at 10,000× of the fracture surfaces of green silicon nitride powder compacts.

FIG. 1 is a photomicrograph of the starting silicon nitride powder which shows a considerable acicular crystalline component having particles with an average aspect ratio of about 10 or greater. After milling the powder for a period of about 24 hours (Example XIII) and pressing a powder compact having 53.1 theoretical density from the milled powder mixture, the photomicrograph of the fracture surface shown in FIG. 2 shows only slightly reduced acicularity from that of the starting powder. As indicated by the upper curve shown in FIG. 5, a green body of this composition having a density of about 53.1% would be expected to sinter to a final density of less than 80% of theoretical.

Figure 3:
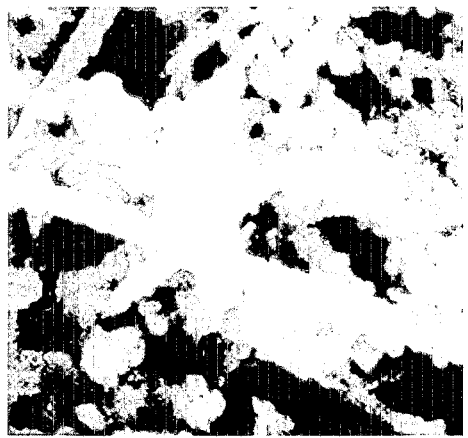

Continued milling of the powder mixture to a total milling time of 48 hours (Example XIV) further reduced the acicularity of the silicon nitride as shown in FIG. 3, and the green body pressed from this powder has a density of 59.1% of theoretical. Such a compact would yield a final densified body of approximately 94+% of theoretical.

Figure 4:
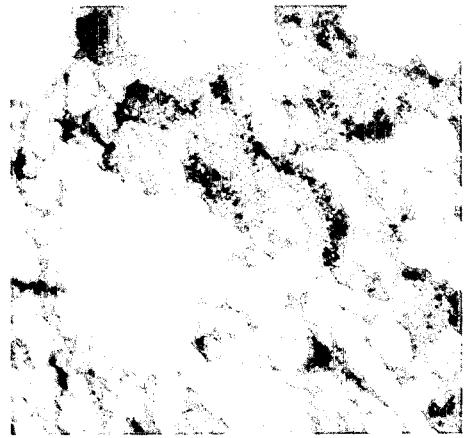

Milling of the powder mixture for 72 hours (Example XV) reduced the average aspect ratio of the silicon nitride needles in the powder mixture to about 3 or less as shown in FIG. 4. This material was pressed into a powder compact of about 61.4% of theoretical which would yield, upon liquid phase sintering, a densified body of greater than 98% of theoretical.

The method, powder mixtures, and green compacts of the present invention thus afford an efficient route to sintered silicon nitride ceramic bodies by liquid phase pressureless sintering which have high theoretical densities, even in those cases which are normally difficult to sinter by pressureless methods.

While there have been shown and described what are believed at present to be the preferred embodiments of the present invention, it will be obvious to one of ordinary skill in the art to which the invention pertains that various changes and modifications may be made therein without departing from the scope of the invention as defined by the appended claims.

What is claimed is:

1. A method of preparing fully dense silicon nitride base ceramic articles comprising the steps of
    blending form about 1 to about 25 mole percent of a metal oxide selected from the group consisting of magnesium oxide, aluminum oxide, silicon dioxide, yttrium oxide, the lanthanide rare earth oxides, and mixtures thereof with the balance consisting essentially of silicon nitride including acicular crystals of said silicon nitride; said acicular crystals having an average aspect ratio greater than 3; said acicular crystals being present in sufficient quantity to yield a compact having a green density less than 60% of theoretical;
    comminuting the blend of metal oxide and silicon nitride to form a powder mixture;
    monitoring said comminuting to determine the degree of acicularity of said acicular crystals of said silicon nitride, said monitoring comprising removing a sample of said powder mixture being comminuted and pressing said sample into a pill, fracturing said pill forming a fractured surface, examining said fractured surface to determine said degree of acicularity of said acicular crystals;
    controlling said comminuting to obtain an average aspect ratio of said acicular crystals of said silicon nitride equal to or less than about 3;
    compacting the comminuted powder mixture to form a green compact having a density of at least 60% of theoretical; and
    pressureless sintering said compact to form an article having a density of at least 98% of theoretical.

2. A method in accordance with claim 1 wherein said step of comminuting comprises ball milling with a milling media-to-charge ratio of 15 to about 30.

3. A method of preparing fully dense silicon nitride based ceramic atricles comprising the steps of
    comminuting silicon nitride, including acicular crystals of said silicon nitride having an average aspect ratio greater than 3
    monitoring said comminuting to determine the degree of acicularity of said acicular crystals of said silicon nitride, said monitoring comprising removing a sample of said powder mixture being comminuted and pressing said sample into a pill, fracturing said pill forming a fractured surface, examining said fractured surface to determine said degree of acicularity of said acicular crystals;
    controlling said comminuting to obtain an average aspect ratio of said acicular crystals of said silicon nitride equal to or less than about 3;
    blending from about 1 to about 25 mole percent of a metal oxide selected from the group consisting of magnesium oxide, aluminum oxide, silicon dioxide, yttrium oxide, the lanthanide rare earth oxides, and mixtures thereof with the blance consisting of the comminuted silicon nitride wherein the average aspect ratio of said acicular crystals is equal to or less than about 3;
    compacting the comminuted powder mixture to form a green compact having a density of at least 60% of theoretical; and
    pressureless sintering said compact to form an article having a density of at least 98% of theoretical.

4. A method in accordance to claim 1 wherein said pressureless sintering is done in a nitrogen gas atmosphere having a pressure according to the formula $$P = e^{[(-a/T)+b]}$$

where P is the pressure in atmospheres, T is the absolute temperature in degrees Kelvin and
    a is about $2.9 \times 10^4$, and
    b is about 15.43.

* * * * *